C. D. EHRET.
OPTICAL PYROMETRY.
APPLICATION FILED APR. 8, 1919.
1,362,403.
Patented Dec. 14, 1920.
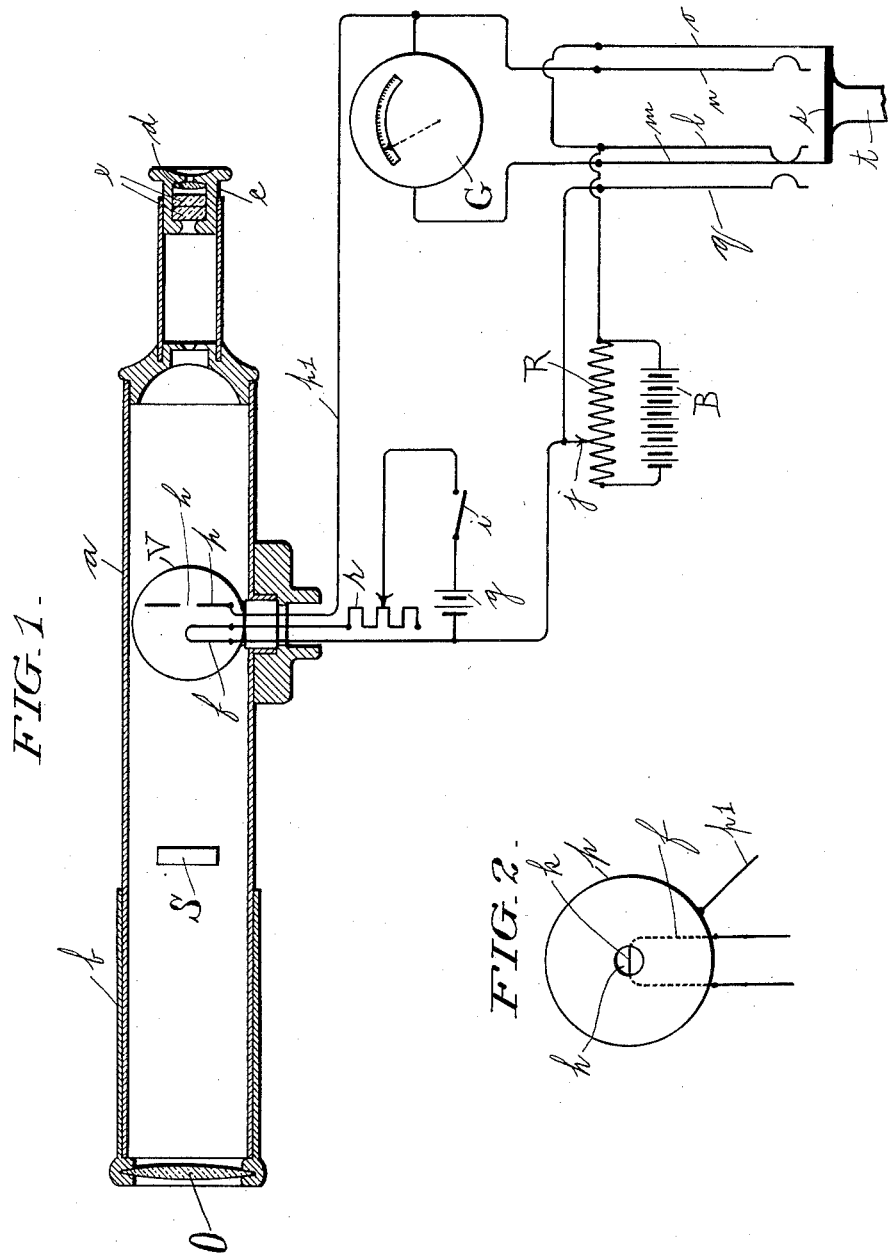
INVENTOR
Cornelius D. Ehret

UNITED STATES PATENT OFFICE.

CORNELIUS D. EHRET, OF PHILADELPHIA, PENNSYLVANIA.

OPTICAL PYROMETRY.

1,362,403. Specification of Letters Patent. Patented Dec. 14, 1920.

Application filed April 8, 1919. Serial No. 288,505.

*To all whom it may concern:*

Be it known that I, CORNELIUS D. EHRET, a citizen of the United States, residing in the city and county of Philadelphia, State of Pennsylvania, have invented a new and useful Improvement in Optical Pyrometry, of which the following is a specification.

My invention relates to optical pyrometry of the general character wherein there is employed a light standard, as an incandescent lamp filament, whose brightness is adjusted to match the brightness of light from an incandescent body whose temperature is to be measured.

In accordance with my invention, the light standard is employed as an emitter of electrons whose quantity varies with different brightnesses or temperatures, and with the electron emitter is employed a plate or anode, and a condition of the anode circuit, as for example the current therein, is measured, and such measurement is an indication of the temperature of the incandescent or glowing body whose temperature is to be determined.

My invention resides broadly in a method of and apparatus for measuring temperature by employment of thermionic action.

For an illustration of one of numerous forms my invention may take, reference is to be had to the accompanying drawing, in which:

Figure 1 is partially a sectional view of optical pyrometric apparatus and partly a diagrammatic view of associated electrical apparatus.

Fig. 2 is a fragmentary view illustrating the relation between a lamp filament and the thermionic anode.

In optical pyrometry as heretofore commonly practised, when employing an incandescent lamp standard measure was made of the current flowing through the lamp filament for determining the temperature of the unknown body. In such case a current of considerable magnitude passed through the filament before it attained incandescence suitable for temperature measuring purposes, and the lower part of the scale of the deflecting galvanometer employed in measuring the filament current was useless as regards temperature measurement.

In accordance with my invention, however, a thermionic device is employed whose filament is incandesced by current flowing therethrough, and the thermionic current or current in the anode circuit may be measured by a deflecting galvanometer. The current in the anode circuit, however, in this case is inconsequential in magnitude until the filament has attained incandescence, and then substantial measurable current flows in the anode circuit. Accordingly, substantially the entire scale of the galvanometer is utilizable, since the galvanometer does not begin to deflect until the filament is at a temperature suitable for temperature measurements by the optical method.

Furthermore, with a given voltage impressed upon the anode circuit of the thermionic device, the current in the anode circuit rises rapidly with increase in filament temperature, whereby in the higher temperature range the deflection of the instrument per unit of temperature will be greater than in the lower temperature range.

Referring to the drawing, $a$ and $b$ are telescopic tubes, the latter provided with an objective lens O. There is a coöperating eye piece structure $c$ comprising, for example, an eye piece lens $d$ and red or other absorbing screen glasses $e$. As usual in optical pyrometry, the absorption screen S may be interposed when it is desired to measure temperatures above the temperature of the light standard.

Within the telescope structure is mounted a thermionic device V which may be of any suitable type having any suitable characteristics respecting degree and character of vacuum, cathode temperature, anode circuit voltage and current, etc. It may comprise a glass bulb evacuated to any suitable degree and containing a filament $f$, of carbon, tungsten or any other suitable material, and an anode or plate $p$ spaced therefrom in the vacuum. Current is supplied to the filament $f$, upon closure of switch $i$, from the battery or other source $g$, and the strength of the current through the filament $f$ may be varied by the adjustable resistance $r$ to bring the filament brightness to match with the brightness of the incandescent body as viewed either with or without the interposition of the screen S.

The plate or anode $p$ may be interposed between the filament $f$ and the eye piece structure and have a hole $h$ through which only the part $k$, Fig. 2, of the filament $f$, is visible for brightness comparison with the brightness of the body whose temperature is to be measured. The plate accordingly limits the amount of filament used in the brightness match visible to the eye, the entire incandescent filament, however, serving as a cathode or emitter of electrons to the plate or anode $p$. In circuit with the filament $f$ and plate $p$ is a resistance R of suitable magnitude and variable by the movable contact $j$ so far as concerns the portion thereof in the plate or anode circuit. A battery or other source of current B is connected to the terminals of the resistance R, and accordingly by varying the position of the contact $j$ the potential impressed upon the anode circuit may be varied. A switch structure may be employed comprising the spring contacts $m$ and $o$, joined by the insulating member $s$, which may be actuated by the handle $t$. The spring member $m$ is connected to one terminal of any suitable galvanometer G, such as a large deflection angle D'Arsonval galvanometer, whose other terminal is connected by conductor $p^1$ to the plate or anode $p$ and to the contact spring $n$, normally out of engagement with the spring $o$. The spring $o$ is electrically connected to the spring contact $l$ normally in contact with the contact spring $m$, the contact springs $l$ and $o$ being connected to one terminal of the resistance R. The movable contact $j$ is connected to the spring contact $q$ normally out of engagement with the spring contact $m$.

The mode of operation is as follows:

The telescope is sighted upon the incandescent body whose temperature is to be measured. The switch $i$ is closed and the resistance $r$ adjusted until the brightness of the filament $f$ matches the brightness of the incandescent body. With the switch contacts $m$ and $o$ in the position indicated, there is then a flow of current in the anode circuit from the plate $p$ through the vacuum space to the filament $f$ to contact $j$ through resistance R to the right of said contact to and through the galvanometer G to conductor $p^1$ to anode $p$. The strength of this current will depend upon the temperature of the filament $f$, which in turn corresponds to that brightness which is necessary to match the brightness of the incandescent body. Accordingly the deflection of the galvanometer G is an indication or measure of the temperature of the incandescent body, variations of the resistance $r$, necessary to vary the brightness of the filament $f$, causing variations in the current strength in the anode circuit and therefore in the deflection of the galvanometer G.

The galvanometer G may be calibrated either in electrical units or in units of temperature, or both; and when a screen S is employed, may have a scale corresponding with the interposition of the screen S, and another scale corresponding for lower temperatures when the screen S is omitted.

To procure a suitable or proper potential to be impressed upon the anode circuit notwithstanding possible variations in the voltage of the battery B, the potentiometer arrangement indicated may be employed. Properly to determine the potential for the anode circuit before making a temperature observation, the handle $t$ is moved toward the left, causing contact spring $o$ to engage contact $n$, and to cause contact spring $m$ to break contact with spring $l$ and to engage contact spring $q$. This changes the galvanometer from series relation with the anode circuit to a relation in shunt to that part of the resistance R to the right of the movable contact $j$. When this connection has been established, and with the switch $i$ open, the contact point $j$ is adjusted backwardly and forwardly until the needle of the galvanometer G points to a predetermined point or mark upon the scale. By this means for temperature measurements at different times or after variations of potential of the battery B the potential impressed upon the anode circuit may be in each instance adjusted to suitable or predetermined value. With the switch $i$ open for this purpose, the thermionic device V is non-conducting between plate and filament, or, otherwise stated, the anode circuit has practically infinite resistance in such case.

What I claim is:

1. The method of measuring temperature, which consists in producing current in a thermionic path, varying the brightness of a body emitting electrons into said path to correspond with the brightness of the body whose temperature is to be measured, and producing by said current an indication of the temperature of said body whose temperature is to be measured.

2. The method of measuring temperature, which consists in producing current in a thermionic path, varying the current through a cathode filament to vary its brightness to correspond with the brightness of light from the incandescent body whose temperature is to be measured, and producing by said current in said thermionic path an indication of the temperature of said incandescent body.

3. Optical pyrometric apparatus comprising a thermionic device having an anode and a cathode, means for varying the temperature of said cathode to cause its brightness to match the brightness of light from the body whose temperature is to be measured, and indicating means affected by the thermionic current between said anode and cathode.

4. Optical pyrometric apparatus comprising a thermionic device having a filament and an anode, means for varying the strength of current through said filament to vary its brightness and electron emission, and a galvanometer associated with the anode circuit of said device for giving indications respecting the temperature to be measured.

5. Optical pyrometric apparatus comprising a filament, means for varying current therethrough to vary its brightness, a member having a perforation through which only a limited portion of said filament is visible, an evacuated chamber within which said filament and said member are disposed, and optical means for simultaneously viewing through said perforation said filament and the body of unknown temperature, said perforation being in the optical axis of said means.

6. Optical pyrometric apparatus comprising a thermionic device having a filament cathode and an anode, an indicating instrument associated with the anode circuit, said anode being disposed between the filament and the observer and obscuring from the observer all but a predetermined portion of said filament.

7. Optical pyrometric apparatus comprising a thermionic device having a filament cathode and an anode, an indicating instrument associated with the anode circuit, said anode limiting the amount of said filament appearing to the observer against the body of unknown temperature.

8. Optical pyrometric apparatus comprising an electron emitting body, means for bringing it to a temperature corresponding with the temperature of the body whose temperature is to be determined, and indicating means controlled by the electron emission from said first named body.

9. Optical pyrometric apparatus comprising an electron emitting body, means for bringing it to a temperature corresponding with the temperature of the body whose temperature is to be determined, and an instrument whose deflection is dependent upon the electron emission from said first named body.

10. Optical pyrometric apparatus comprising an electron emitting body, means for bringing it to a temperature corresponding with the temperature of the body whose temperature is to be determined, and an instrument calibrated in temperature units whose deflection is dependent upon the electron emission from said first named body.

11. The method of measuring the temperature of a body which consists in bringing an electron emitting body to a temperature corresponding with the temperature of said first named body, and determining the temperature from the electron emission.

12. The method of measuring the temperature of a body, which consists in producing an electron emission corresponding with the temperature of said body, and determining the temperature from the electron emission.

In testimony whereof I have hereunto affixed my signature this 7th day of April, 1919.

CORNELIUS D. EHRET.